United States Patent [19]

Pasevic et al.

[11] Patent Number: 5,315,626
[45] Date of Patent: May 24, 1994

[54] METHOD FOR TREATING THE PRIMARY COOLING MEDIUM OF A PRESSURIZED WATER NUCLEAR REACTOR

[75] Inventors: Vladimir I. Pasevic; Dmitrii V. Pasevic, both of Mytisci, U.S.S.R.

[73] Assignee: Techno-Invest Entwicklung Von Technologien GmbH, Bundesrepublik, Fed. Rep. of Germany

[21] Appl. No.: 926,579

[22] Filed: Aug. 6, 1992

[30] Foreign Application Priority Data

Aug. 9, 1991 [DE] Fed. Rep. of Germany ....... 4126467

[51] Int. Cl.$^5$ ............................................. G21C 9/00
[52] U.S. Cl. .................................. 376/306; 376/305; 252/631
[58] Field of Search ................... 376/306, 305, 904; 148/677; 252/631; 976/DIG. 376

[56] References Cited

U.S. PATENT DOCUMENTS

| | | | |
|---|---|---|---|
| 3,819,476 | 6/1974 | Pockck et al. | 376/306 |
| 4,059,671 | 11/1977 | Schmieder et al. | 423/10 |
| 4,828,790 | 5/1989 | Honda et al. | 376/306 |
| 4,981,641 | 1/1991 | Campion | 376/306 |
| 5,169,563 | 12/1992 | Katayama | 252/389.53 |

FOREIGN PATENT DOCUMENTS 277126  4/1977  U.S.S.R. .

*Primary Examiner*—Donald P. Walsh
*Assistant Examiner*—Meena Chelliah
*Attorney, Agent, or Firm*—Kane, Dalsimer, Sullivan, Kurucz, Levy, Eisele and Richard

[57] ABSTRACT

The invention is of a method for treating the primary cooling medium of a pressurized water nuclear reactor by controlling its efficiency through the $H_3BO_3$ content in the cooling medium. Hydrazine hydrate ($N_2H_4 \cdot H_2O$) is continuously fed to the coolant of a reactor which is charged for energy generation, to such an extent that its content equals $5 \cdot 10^{-6}$ to $5 \cdot 10^{-2}$ g/kg coolant medium as well as KOH and/or LiOH which corresponds to the alkaline properties of KOH in an amount of 80 to 56 mg/kg cooling medium with respect to the amount of $H_3BO_3$ in a range of 20 to 0 g/kg cooling medium and the excess hydrogen is removed from the system leaving a maximum amount of hydrogen in the coolant medium of 100 n·ml/kg.

3 Claims, 2 Drawing Sheets

$$Ni - H_2O - H_2 - (H^+, OH^-)$$

$$m_{H_2} = 5 \cdot 10^{-5}$$

METHOD FOR TREATING THE PRIMARY COOLING MEDIUM OF A PRESSURIZED WATER NUCLEAR REACTOR

BACKGROUND OF THE INVENTION

1. Field of the Invention

The invention relates to a pressurized water reactor and to controlling its efficiency by the content of boric acid ($H_3BO_3$) in the cooling medium.

2. Brief Description of Related Art

As is generally known, the strongest activation during operation of nuclear reactors occurs in the insoluble compounds and metal oxides contained in the cooling medium (O.I. Martynov, A.S. Kopylov, "Vodno-chimiceskie Rezimy AES, Sisteny Ich Poddersanija i Kontrolja", Moscow, Energoisdat, 1983, pgs. 49-50).

The determination of the solubility constant of metal oxides has shown that in reactor water, depending on the temperature and the LiOH and KOHconcentration, considerable lower solubility exists for nickel oxide than for oxides of iron, chromium, manganese, cobalt and other oxides under practically the same conditions.

During the reactor operation the nickel oxide becomes the source for forming of $^{58}Co$, one of the most important contaminating radioactive isotopes in reactors mostly made from steel with a high Ni-content.

An increase in solubility of nickel oxide can occur by either increasing the temperature of the medium or by increasing the alkalinity of the cooling medium, by increasing the content of LiOH or KOH. However, an increase in the temperature of the medium by an increased heat release in the core results in a reduction of safety during the operation of the fuel elements (A.S. Kopylov, E.I. Verchovskij "Specvodoocistka na Atomnych Elektrostanceijach", Moscow, "Vysvaja skola", 1988, pg. 109).

The increase of alkalinity of the cooling medium in pressurized water reactors was tested (see report of IAEA, Coolant Technology of Water Reactors, Doc. 0846j, 03.11.91, pgs. 27-29). A maximum of a permissible pH-value of 8 was found and established (with the aid of a hot sample), that due to the formation of certain amounts of oxide radicals, i.e., of radiolysis products of the water, the increase of alkalinity may result in embrittlement of non-rusting steels of which the individual components of the nuclear reactors are made. The permissible alkalinity ranges, in dependency from the $H_3BO_3$ amount, are stated in the Report of IAEA "Coolant Technology of Water Reactors" (Doc. 0846j), 03.11.91, pg. 27.

It is an object of the invention to provide a marked increase of the solubility of Ni-oxides and thereby a lowering of the contamination of reactors with $^{58}Co$.

SUMMARY OF THE INVENTION

The object of the invention is achieved when hydrazine hydrate ($N_2H_4 \cdot H_2O$) is fed continuously to the coolant of a reactor which is charged for energy generation, in an amount of $5.10^{-6}$ to $5.10^{-2}$ g/kg coolant medium, as well as KOH and/or LiOH, which corresponds to the alkaline properties of KOH in an amount of 80 to 5.6 mg/kg cooling agent with respect to the amount of $H_3BO_3$ moving in a range of 20 to 0 g/kg cooling agent and the excess hydrogen is removed from the system leaving a maximum amount of hydrogen in the coolant medium of 100 n·ml/kg.

The continuous supply of hydrazine hydrate to the coolant medium enables a practically complete avoidance of the formation of oxide radicals and thereby an increase of the alkaline concentration, without generating the danger of alkaline embrittlement of the non-rusting steel.

DETAILED DESCRIPTION OF THE INVENTION

The preferred amounts of the KOH and/or LiOH fed to the coolant medium is 35 to 5.6 mg/kg for a concentration of $H_3BO_3$ of 10 to 0 g/kg.

These amounts correspond to a reactor operation period, since the $H_3BO_3$ concentration with a corresponding lowering of the concentration of the alkaline additives is lowered from an initial 20 g/kg to 0 g/kg.

Figure 1:
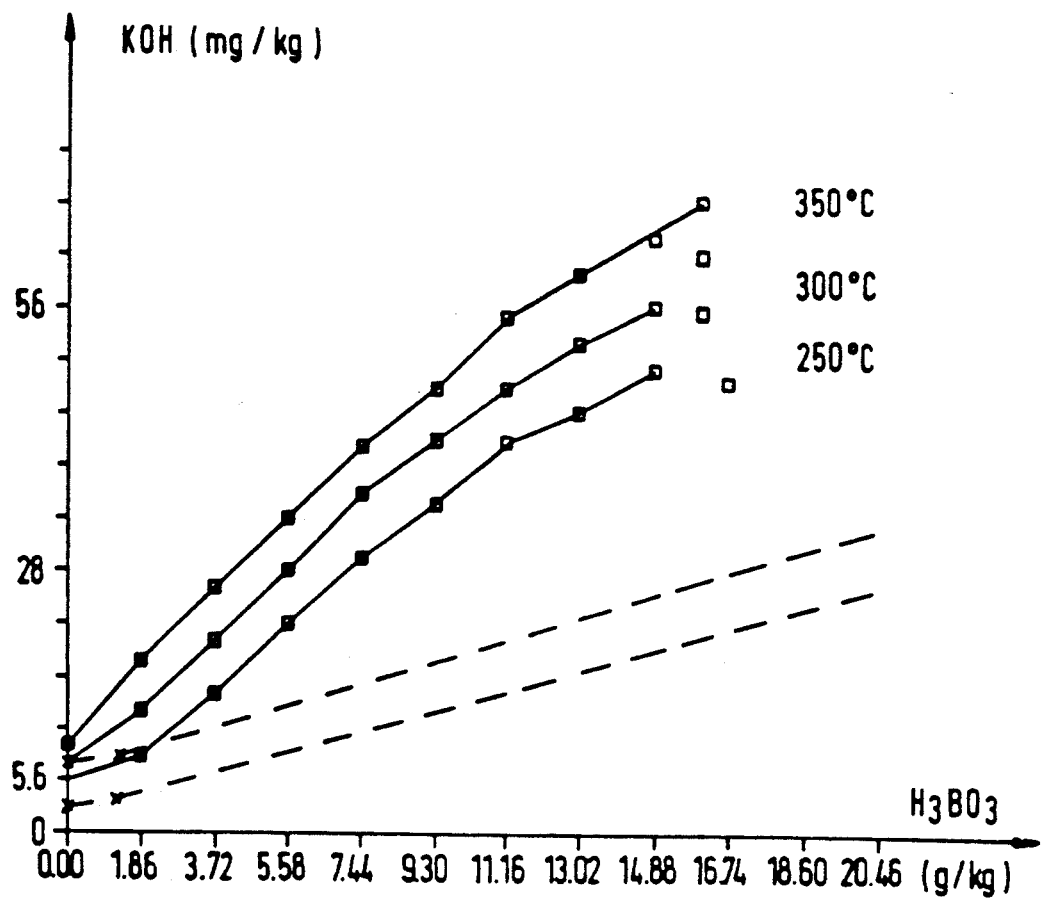
FIG. 1 is a graphical representation illustrating the relationship between KOH and $H_3BO_3$ concentrations at various operating temperatures.

FIG. 1 illustrates the dependency of the amounts of KOH and/or LiOH from the amount of $H_3BO_3$. The broken lines correspond to the known method and the continuous lines illustrate the inventive method with different temperatures of the cooling medium during the efficient operation of nuclear reactor.

A comparison of the graphs shown in FIG. 1 shows that with the amount of $H_3BO_3$ (for example 17 g/kg coolant agent) 22 mg alkali per cooling medium is fed in the known method, while with the method in accordance with the invention the amount is increased to about 50-70 mg/kg.

Figure 2:
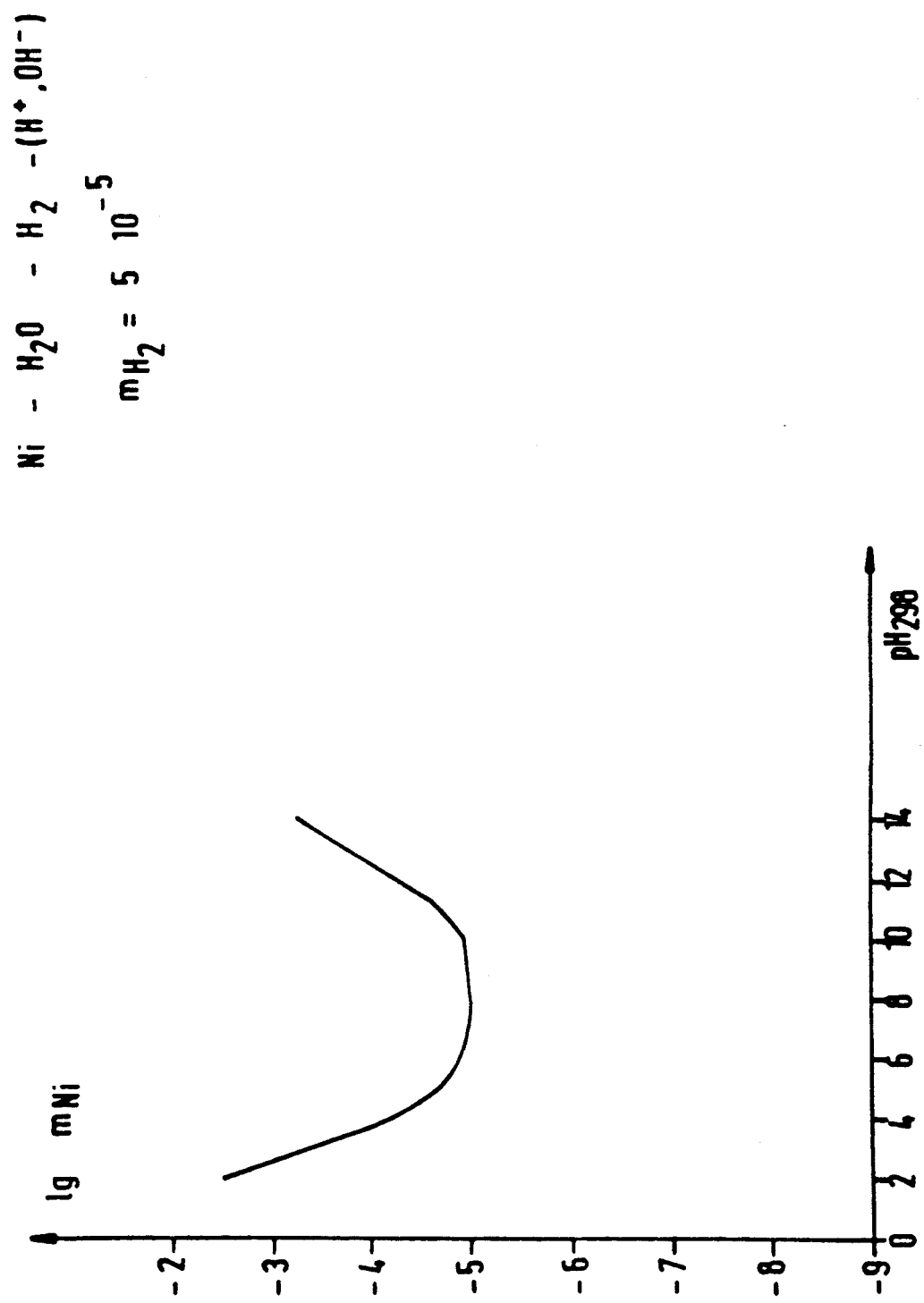
FIG. 2 is a graphical representation showing the dependency of nickel oxide solution on pH of the coolant medium.

FIG. 2 illustrates the dependency of the oxide on the pH-value of the cooling medium being brought to the operating temperature of the reactor with a full load. The known nuclear reactors operate with a pH of 7 to 8. The amounts of KOH and/or LiOH fed to the coolant medium enable an increase of the pH of the cooling medium to 10-13 which favors solution of the nickel oxide without embrittlement of non-rusting steel.

The method may be performed in operating reactors by replacing ammonia ($NH_3$) with hydrazine hydrate, as well as in new reactors being put into operation.

The method of the invention is preferably carried out as follows:

Before starting the reactor the ion exchange filters are saturated with balancing concentrations of $NH_3$ and KOH and/or LiOH for purifying the water.

After transfer to commercial energy making and stabilization of the $H_3BO_3$ concentration in the reactor, an indicated amount of hydrazine hydrate is continuously fed to the coolant and excess hydrogen is removed to leave a maximum amount of hydrogen in the coolant medium of 100 n·ml/kg. The KOH and/or LiOH is fed to the cooling medium at amounts which depend on the $H_3BO_3$ concentration and the temperature conditions of the coolant in accordance with FIG. 1 described above.

What is claimed is:

1. Method for treating a primary cooling medium of a pressurized water nuclear reactor by controlling its efficiency through the $H_3BO_3$ content in the cooling medium, which comprises; continuously feeding hydrazine hydrate to the cooling medium of the reactor, which is charged for energy generation, in an amount of $5 \cdot 10^{-6}$ to $5 \cdot 10^{-2}$ g/kg coolant medium, as well as KOH and/or LiOH which corresponds to the alkaline properties of KOH at an amount of 80 to 5.6 mg/kg cooling medium with respect to the amount of $H_3BO_3$ in a range of 20 to 0 g/kg cooling medium and which removes excess hydrogen from the system leaving a maximum amount of hydrogen in the coolant medium of 100 n·ml/kg.

2. Method in accordance with claim 1 wherein KOH is also fed to the cooling medium in a concentration of 35 to 5.6 mg with respect to 1 kg coolant having a concentration of boric acid of 0 to 10 g per kg cooling medium.

3. Method in accordance with claim 2 wherein at least part of the KOH is replaced with an equivalent amount of LiOH.

* * * * *